US012611844B2

(12) United States Patent
Shi et al.

(10) Patent No.: US 12,611,844 B2
(45) Date of Patent: Apr. 28, 2026

(54) THERMOPLASTIC JOINING FILMS AND METHODS FOR JOINING THERMOPLASTIC AND THERMOSET COMPOSITE MATERIALS

(71) Applicant: The Boeing Company, Arlington, VA (US)

(72) Inventors: Ying Shi, St. Louis, MO (US); Marcos Pantoja, St. Louis, MO (US); Alexander M. Rubin, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 244 days.

(21) Appl. No.: 18/177,710

(22) Filed: Mar. 2, 2023

(65) Prior Publication Data

US 2023/0202138 A1    Jun. 29, 2023

Related U.S. Application Data

(63) Continuation-in-part of application No. 17/530,978, filed on Nov. 19, 2021, now Pat. No. 12,227,647.

(51) Int. Cl.
| | |
|---|---|
| *B32B 7/12* | (2006.01) |
| *B32B 27/08* | (2006.01) |
| *B32B 27/28* | (2006.01) |
| *B32B 27/38* | (2006.01) |
| *B32B 37/06* | (2006.01) |
| *B32B 37/12* | (2006.01) |
| *B32B 5/02* | (2006.01) |
| *B32B 27/12* | (2006.01) |

(52) U.S. Cl.
CPC .............. *B32B 7/12* (2013.01); *B32B 27/08* (2013.01); *B32B 27/281* (2013.01); *B32B 27/285* (2013.01); *B32B 27/38* (2013.01); *B32B 37/06* (2013.01); *B32B 37/1284* (2013.01); *B32B 5/024* (2013.01); *B32B 27/12* (2013.01); *B32B 2250/24* (2013.01); *B32B 2260/021* (2013.01); *B32B 2260/046* (2013.01); *B32B 2262/106* (2013.01); *B32B 2270/00* (2013.01); *B32B 2307/704* (2013.01); *B32B 2309/02* (2013.01); *B32B 2363/00* (2013.01); *B32B 2371/00* (2013.01); *B32B 2379/08* (2013.01); *B32B 2605/18* (2013.01)

(58) Field of Classification Search
CPC ......... B32B 7/12; B32B 27/08; B32B 27/281; B32B 27/285; B32B 27/38; B32B 37/06; B32B 37/1284; B32B 5/024; B32B 27/12; B32B 2250/24; B32B 2260/021; B32B 2260/046; B32B 2262/106; B32B 2270/00; B32B 2307/704; B32B 2309/02; B32B 2363/00; B32B 2371/00; B32B 2379/08; B32B 2605/18
See application file for complete search history.

(56) References Cited

U.S. PATENT DOCUMENTS

| | | | |
|---|---|---|---|
| 5,643,390 | A | 7/1997 | Don et al. |
| 11,952,099 | B2 | 4/2024 | Blom-Schieber et al. |
| 2003/0186068 | A1 | 10/2003 | Taniguchi et al. |
| 2019/0061273 | A1 | 2/2019 | Linde et al. |
| 2019/0329464 | A1 | 10/2019 | Ikeda et al. |
| 2021/0102068 | A1 | 4/2021 | Said et al. |
| 2022/0250334 | A1 | 8/2022 | Zhao et al. |
| 2022/0266541 | A1 | 8/2022 | Shi et al. |
| 2022/0404106 | A1 | 12/2022 | Suzuki et al. |

FOREIGN PATENT DOCUMENTS

| | | | |
|---|---|---|---|
| CA | 2392822 | A1 | 1/2004 |
| DE | 102019106446 | A1 | 9/2020 |
| EP | 2899231 | A1 | 7/2015 |
| EP | 3854834 | A1 | 7/2021 |
| KR | 100549211 | B1 | 2/2006 |
| WO | 2006006508 | A1 | 1/2006 |
| WO | 2017072007 | A1 | 5/2017 |
| WO | 2021106561 | A1 | 6/2021 |
| WO | 2022122881 | A1 | 6/2022 |

OTHER PUBLICATIONS

Office Action, dated Apr. 17, 2025, regarding U.S. Appl. No. 18/177,699, 24 pages.
Pantoja et al., "Forming Joints Between Composite Components," U.S. Appl. No. 18/177,699, filed Mar. 2, 2023, 79 pages.
Crevecoeur et al: "Binary Blends of Poly(Ether Ether Ketone) and Poly(Ether Imide). Miscibility, Crystallization Behavior, and Semicrystalline Morphology", Macromolecules, American Chemical Society, US, vol. 24, No. 5, Mar. 4, 1991 (Mar. 4, 1991), pp. 1190-1195, XP000219313, ISSN: 0024-9297, DOI: 10.1021/MA00005A034.
European Patent Office Extended Search Report, dated May 19, 2023, regarding Application No. EP22194863.1, 9 pages.
Harris J. E. et al: "Miscible blends of poly(aryl ether ketone)s and polyetherimides" Journal of Applied Polymer Science, vol. 35, No. 7, May 20, 1988 (May 20, 1988), pp. 1877-1891, XP93045720, US, ISSN: 0021-8995, DOI: 10.1002/app.1988.070350713.
European Patent Office Extended Search Report, dated Oct. 7, 2024, regarding Application No. EP24155762.8, 8 pages.
European Patent Office Extended Search Report, dated Oct. 21, 2025, regarding Application No. EP25170664.4, 7 pages.
Final Office Action, dated Sep. 17, 2025, regarding U.S. Appl. No. 18/177,699, 9 pages.
Notice of Allowance, dated Dec. 4, 2025, regarding U.S. Appl. No. 18/177,699, 16 pages.
Office Action, dated Nov. 19, 2025, regarding U.S. Appl. No. 18/782,162, 17 pages.

*Primary Examiner* — Callie E Shosho
*Assistant Examiner* — Bethany M Miller
(74) *Attorney, Agent, or Firm* — Yee & Associates, P.C.

(57) ABSTRACT

A thermoplastic composition includes a thermoplastic polymer and a polyaryletherketone polymer in admixture with the thermoplastic polymer.

22 Claims, 11 Drawing Sheets

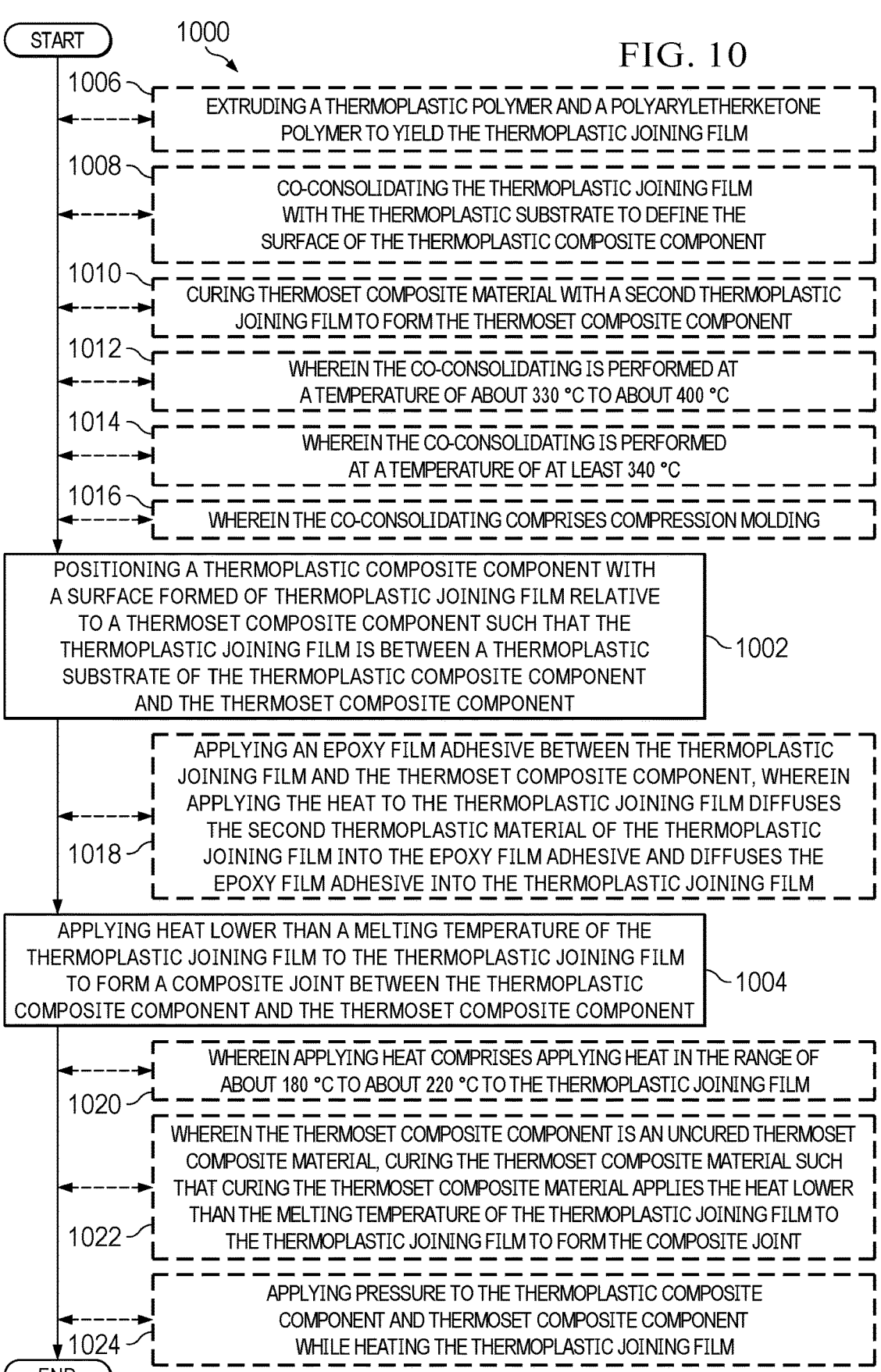

START

1006 — EXTRUDING A THERMOPLASTIC POLYMER AND A POLYARYLETHERKETONE POLYMER TO YIELD THE THERMOPLASTIC JOINING FILM

1008 — CO-CONSOLIDATING THE THERMOPLASTIC JOINING FILM WITH THE THERMOPLASTIC SUBSTRATE TO DEFINE THE SURFACE OF THE THERMOPLASTIC COMPOSITE COMPONENT

1010 — CURING THERMOSET COMPOSITE MATERIAL WITH A SECOND THERMOPLASTIC JOINING FILM TO FORM THE THERMOSET COMPOSITE COMPONENT

1012 — WHEREIN THE CO-CONSOLIDATING IS PERFORMED AT A TEMPERATURE OF ABOUT 330 °C TO ABOUT 400 °C

1014 — WHEREIN THE CO-CONSOLIDATING IS PERFORMED AT A TEMPERATURE OF AT LEAST 340 °C

1016 — WHEREIN THE CO-CONSOLIDATING COMPRISES COMPRESSION MOLDING

POSITIONING A THERMOPLASTIC COMPOSITE COMPONENT WITH A SURFACE FORMED OF THERMOPLASTIC JOINING FILM RELATIVE TO A THERMOSET COMPOSITE COMPONENT SUCH THAT THE THERMOPLASTIC JOINING FILM IS BETWEEN A THERMOPLASTIC SUBSTRATE OF THE THERMOPLASTIC COMPOSITE COMPONENT AND THE THERMOSET COMPOSITE COMPONENT — 1002

APPLYING AN EPOXY FILM ADHESIVE BETWEEN THE THERMOPLASTIC JOINING FILM AND THE THERMOSET COMPOSITE COMPONENT, WHEREIN APPLYING THE HEAT TO THE THERMOPLASTIC JOINING FILM DIFFUSES THE SECOND THERMOPLASTIC MATERIAL OF THE THERMOPLASTIC JOINING FILM INTO THE EPOXY FILM ADHESIVE AND DIFFUSES THE EPOXY FILM ADHESIVE INTO THE THERMOPLASTIC JOINING FILM — 1018

APPLYING HEAT LOWER THAN A MELTING TEMPERATURE OF THE THERMOPLASTIC JOINING FILM TO THE THERMOPLASTIC JOINING FILM TO FORM A COMPOSITE JOINT BETWEEN THE THERMOPLASTIC COMPOSITE COMPONENT AND THE THERMOSET COMPOSITE COMPONENT — 1004

WHEREIN APPLYING HEAT COMPRISES APPLYING HEAT IN THE RANGE OF ABOUT 180 °C TO ABOUT 220 °C TO THE THERMOPLASTIC JOINING FILM — 1020

WHEREIN THE THERMOSET COMPOSITE COMPONENT IS AN UNCURED THERMOSET COMPOSITE MATERIAL, CURING THE THERMOSET COMPOSITE MATERIAL SUCH THAT CURING THE THERMOSET COMPOSITE MATERIAL APPLIES THE HEAT LOWER THAN THE MELTING TEMPERATURE OF THE THERMOPLASTIC JOINING FILM TO THE THERMOPLASTIC JOINING FILM TO FORM THE COMPOSITE JOINT — 1022

APPLYING PRESSURE TO THE THERMOPLASTIC COMPOSITE COMPONENT AND THERMOSET COMPOSITE COMPONENT WHILE HEATING THE THERMOPLASTIC JOINING FILM — 1024

END

1

THERMOPLASTIC JOINING FILMS AND METHODS FOR JOINING THERMOPLASTIC AND THERMOSET COMPOSITE MATERIALS

CROSS-REFERENCE TO RELATED APPLICATION

The present application is a Continuation-in-Part of U.S. patent application Ser. No. 17/530,978, now U.S. Pat. No. 12,227,647, filed on Nov. 19, 2021, entitled "THERMO-PLASTIC FILMS AND METHODS FOR COATING THERMOPLASTIC SUBSTRATES WITH THERMOSET MATERIALS," the complete disclosure of which is incorporated herein by reference.

BACKGROUND INFORMATION

1. Field

This application relates to thermoplastic compositions and, more specifically, to thermoplastic films and methods for coating thermoplastic substrates with thermoset materials in the aerospace industry.

2. Background

The process of finishing polyaryletherketone-based structural thermoplastic composites presents challenges, specifically with respect to medium and large-scale components, particularly those used in airstream applications. Current surface treatment techniques include the need for mechanically treating substrate surfaces using techniques such as sand blasting, grit blasting, plasma treatment, and other techniques that roughen substrate surfaces prior to bonding with a thermoset material.

Conventional surface treatment techniques present challenges with respect to adhesion and miscibility. Therefore, those skilled in the art continue with research and development efforts in the field of coating thermoplastic substrates with thermoset materials.

SUMMARY

Disclosed are thermoplastic compositions.

In one example, the disclosed thermoplastic composition includes a thermoplastic polymer and a polyaryletherketone polymer in admixture with the thermoplastic polymer.

Also disclosed are consolidated laminate structures.

In one example, the disclosed consolidated laminate structure includes a thermoplastic substrate including a thermoplastic polymer and a thermoplastic composition consolidated with the thermoplastic substrate to define a receiving surface. The thermoplastic composition includes a thermoplastic polymer and a polyaryletherketone polymer in admixture with the thermoplastic polymer.

Also disclosed are methods for manufacturing consolidated laminate structures.

In one example, the disclosed method for manufacturing a consolidated laminate structure includes applying a thermoplastic composition to a first major surface of a thermoplastic substrate. The thermoplastic composition includes a thermoplastic polymer and a polyaryletherketone polymer in admixture with the thermoplastic polymer. The method further includes co-consolidating the thermoplastic composition with the thermoplastic substrate to define a receiving surface.

An embodiment of the present disclosure provides a composite structure. The composite structure comprises a thermoset composite component; a thermoplastic composite component; and a thermoplastic joining film forming a structural composite joint between the thermoset composite component and the thermoplastic composite component, the thermoplastic joining film comprising a thermoplastic polymer and a polyaryletherketone polymer in admixture with the thermoplastic polymer.

An embodiment of the present disclosure provides a method for manufacturing a composite structure. A thermoplastic composite component with a surface formed of thermoplastic joining film is positioned relative to a thermoset composite component such that the thermoplastic joining film is between a thermoplastic substrate of the thermoplastic composite component and the thermoset composite component. Heat lower than a melting temperature of the thermoplastic joining film is applied to the thermoplastic joining film to form a composite joint between the thermoplastic composite component and the thermoset composite component.

An embodiment of the present disclosure provides a composite structure comprises a thermoset composite component; a second thermoset composite component; and a thermoplastic joining film forming a structural composite joint between the thermoset composite component and the second thermoset composite component, the thermoplastic joining film comprising a thermoplastic polymer and a polyaryletherketone polymer in admixture with the thermoplastic polymer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is a flowchart of a method of manufacturing a composite structure in accordance with an illustrative embodiment;

DETAILED DESCRIPTION

Disclosed are compositions and methods for chemically modifying a receiving surface of a thermoplastic composite substrate. The compositions and methods improve compatibility of a thermoplastic composite substrate and a thermoset coating, such as an epoxy-based primer. The disclosed compositions and methods account for threshold adhesive properties with the thermoset coating and miscibility of the components of the compositions. The result is a modified surface of the thermoplastic composite material to enhance compatibility to a thermoset coating.

Figure 1:
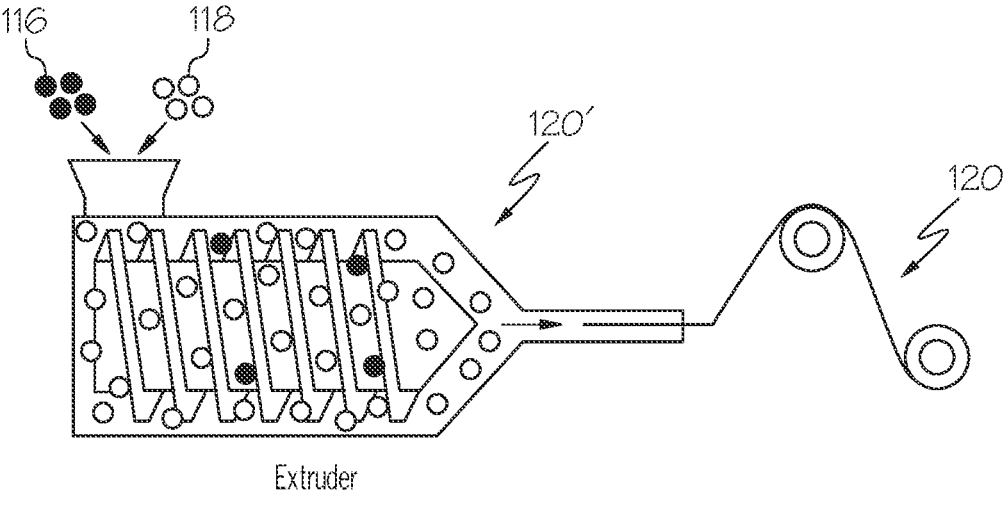
FIG. 1 is a schematic diagram of a method for forming a thermoplastic film.

Referring to FIG. 1, disclosed is a thermoplastic composition 120'. The thermoplastic composition includes a thermoplastic polymer 116 and a polyaryletherketone polymer 118 in admixture with the thermoplastic polymer 116. The thermoplastic composition may be manufactured by combining and blending the thermoplastic polymer and the polyaryletherketone polymer 118 in an extruder and extruding the resulting composition into a coating, such as a film 120.

The thermoplastic polymer 116 of the thermoplastic composition 120' may be selected based upon material properties such as threshold adhesive properties that align with a mating thermoset coating 130 and miscibility with the thermoplastic substrate 110 material such that a first major surface 112 of a receiving thermoplastic substrate 110 is modified to enhance compatibility with a thermoset coating 130. Further, the thermoplastic polymer 116 is miscible with polyaryletherketone polymers. In one example, the thermoplastic polymer 116 of the thermoplastic composition 120' includes polyetherimide. The thermoplastic polymer 116 may be amorphous. The thermoplastic polymer 116 is compatible with aerospace grade paints and coatings and is stable at processing temperatures of at least about 350° C.

In one example, the polyaryletherketone polymer 118 is a semi-crystalline material belonging to the family of polyaryletherketone (PAEK) polymers. The polyaryletherketone polymer 118 may be in the form of a film plastic pellets, powder, etc. The polyaryletherketone polymer 118 may include polyether ether ketone. In another example, the polyaryletherketone polymer includes polyether ketone ketone.

In yet another example, the polyaryletherketone polymer includes a blend of at least two polyaryletherketones. For example, the polyaryletherketone polymer may include a blend of polyether ketone ketone and polyether ether ketone.

The thermoplastic composition 120' has a melting temperature based upon the ratio of thermoplastic polymer 116 to the polyaryletherketone polymer 118 and the respective melting temperatures of each of the thermoplastic polymer to the polyaryletherketone polymer 118. In one example, the melting temperature of the polyaryletherketone polymer 118 is about 275° C. to about 350° C. In another example, the melting temperature of the polyaryletherketone polymer 118 is at least about 300° C.

The thermoplastic composition 120' includes a ratio of the thermoplastic polymer 116 to the polyaryletherketone polymer 118. In one example, the ratio of the thermoplastic polymer 116 to the polyaryletherketone polymer 118 is between about 1:20 and about 1:1. In another example, the ratio of the thermoplastic polymer 116 to the polyaryletherketone polymer 118 is between about 10:90 and about 50:50. In another example, the ratio of the thermoplastic polymer 116 to the polyaryletherketone polymer 118 is between about 1:9 and about 1:1. In yet another example, the ratio of the thermoplastic polymer 116 to the polyaryletherketone polymer 118 is between about 20:80 and about 50:50.

The thermoplastic composition 120' includes a degree of crystallinity such that it is a semi-crystalline material. In one example, the degree of crystallinity is from about 1 percent to about 30 percent. In another example, the degree of crystallinity is from about 2 percent to about 15 percent. In yet another example, the degree of crystallinity is from about 3 percent to about 10 percent.

The thermoplastic composition 120' may include additional additives. In one example, the thermoplastic composition 120' includes a heat stabilizer. In another example, the thermoplastic composition 120' includes a nucleating agent.

Figure 2:
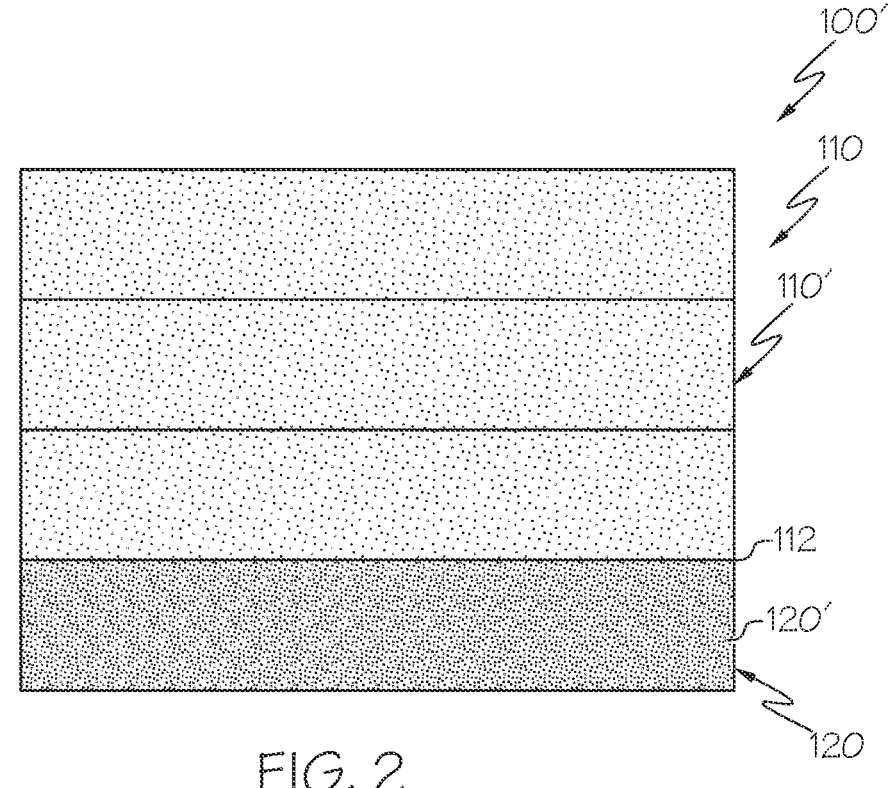
FIG. 2 is a cross sectional schematic of a laminate structure prior to consolidation.
Figure 3:
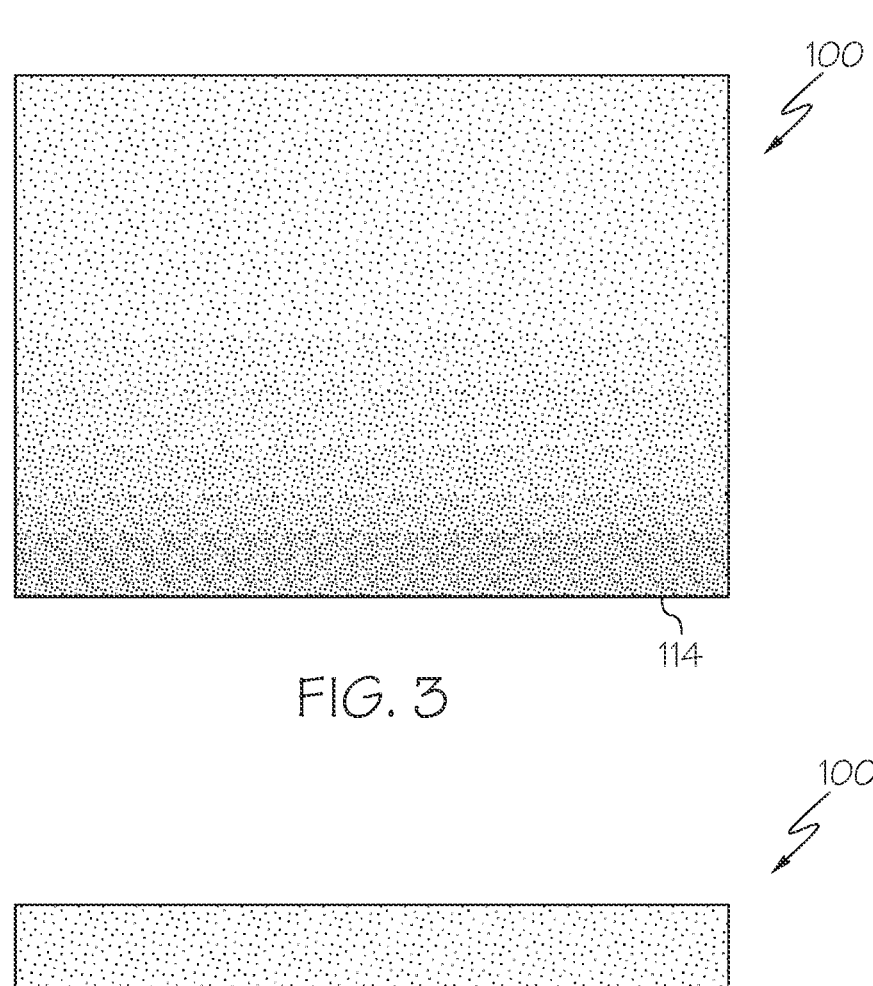
FIG. 3 is a cross sectional schematic of the laminate structure of FIG. 2 after consolidation.
Figure 4:
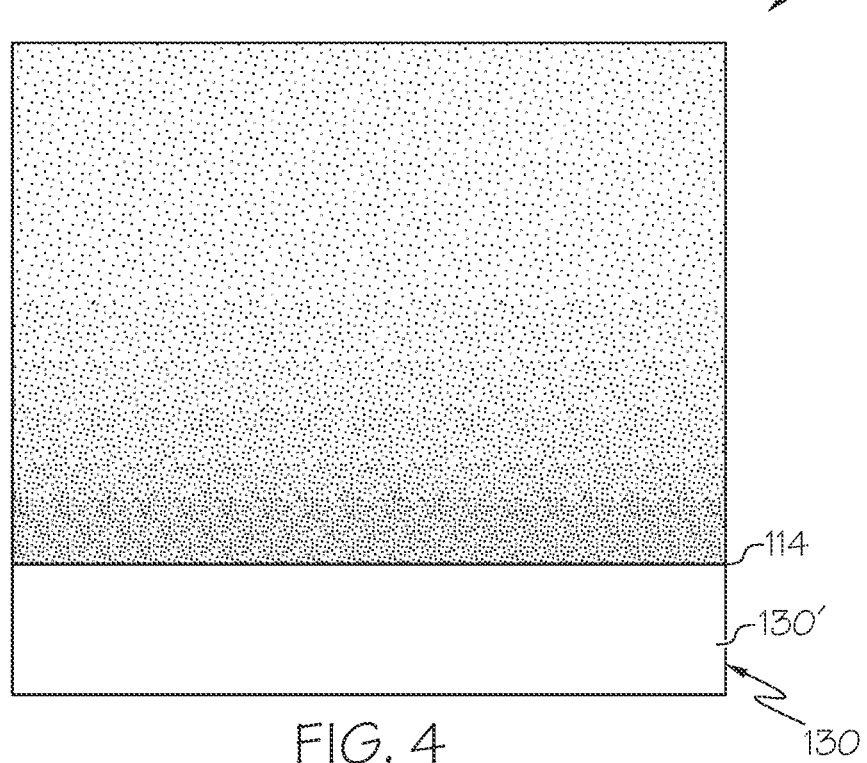
FIG. 4 is a cross sectional schematic of the laminate structure of FIG. 3 with an additional coating.

Referring to FIG. 2, the thermoplastic composition 120' may be extruded into a film 120 for application on a thermoplastic substrate 110 to form a laminate structure 100'. In one example, the film 120 has a thickness of about 1 mil to about 15 mil. The laminate structure 100' may be co-consolidated into a consolidated laminate structure 100, see FIG. 3. In one example, the consolidated laminate structure 100 includes a thermoplastic substrate 110. The thermoplastic substrate 110 includes a thermoplastic polymer. In one example, the thermoplastic polymer of the thermoplastic substrate 110 includes a polyaryletherketone polymer.

The thermoplastic substrate 110 may be formed of at least two plies 110' of laminate in a stacked configuration. The at least two plies 110' of laminate may include a polymer from the family of polyaryletherketone (PAEK) polymers. In one example, the at least two plies 110' of laminate include polyether ketone ketone.

The consolidated laminate structure 100 further includes a thermoplastic composition 120' consolidated with the thermoplastic substrate 110 to define a receiving surface 114 of the consolidated laminate structure 100. The thermoplastic composition 120' includes a thermoplastic polymer 116 and a polyaryletherketone polymer 118 in admixture with the thermoplastic polymer 116.

The thermoplastic polymer 116 of the thermoplastic composition 120' may be selected based upon material properties such as threshold adhesive properties that align with a mating thermoset coating 130 and miscibility with the thermoplastic substrate 110 material such that a first major surface 112 of a receiving thermoplastic substrate 110 is modified to enhance compatibility with a thermoset coating 130. In one example, the thermoplastic polymer of the consolidated laminate structure 100 includes polyetherimide. The thermoplastic polymer 116 may be amorphous. The thermoplastic polymer 116 is compatible with aerospace grade paints and coatings and is stable at processing temperatures of at least about 350° C.

In one example, the polyaryletherketone polymer 118 of the consolidated laminate structure 100 includes at least one of polyether ether ketone and polyether ketone ketone. In another example, the polyaryletherketone polymer 118 of the consolidated laminate structure 100 includes a blend of polyether ether ketone and polyether ketone ketone.

In one example, the ratio of the thermoplastic polymer 116 to the polyaryletherketone polymer 118 is between about 1:20 and about 1:1. In another example, the ratio of the thermoplastic polymer 116 to the polyaryletherketone polymer 118 is between about 10:90 and about 50:50. In another example, the ratio of the thermoplastic polymer 116 to the polyaryletherketone polymer 118 is between about 1:9 and about 1:1. In yet another example, the ratio of the thermoplastic polymer 116 to the polyaryletherketone polymer 118 is between about 20:80 and about 50:50.

The consolidated laminate structure 100 may further include a thermoset material 130' applied to the receiving surface 114. In one example, the thermoset material 130' is in the form of a thermoset coating 130. In one example, the thermoset material 130' may include an epoxy. In another example, the thermoset material 130' may be a primer, such as a paint primer. Additionally, the consolidated laminate structure 100 may further include a top coat 140 applied to the thermoset material 130', or primer, see FIG. 5. In one example, the top coat 140 includes polyurethane.

Figure 6:
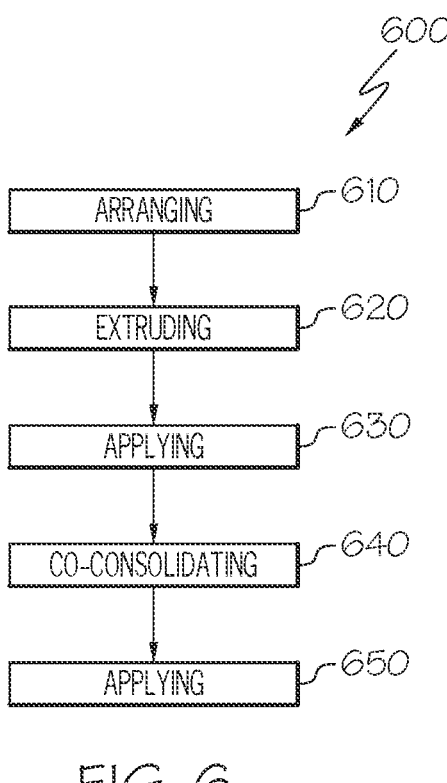
FIG. 6 is a flow diagram of a method for manufacturing a consolidated laminate structure.

Referring to FIG. 6, disclosed is a method 600 for manufacturing a consolidated laminate structure 100. The method 600 includes applying a thermoplastic composition to a first major surface 112 of a thermoplastic substrate 110. In one example, the thermoplastic substrate is a layered structure including at least two layers of thermoplastic material.

The thermoplastic composition 120' of the method 600 includes a thermoplastic polymer 116 and a polyaryletherketone polymer in admixture with the thermoplastic polymer 116. In one example, the thermoplastic polymer 116 comprises polyetherimide. Further, in one or more examples, the polyaryletherketone polymer 118 comprises at least one of polyether ether ketone and polyether ketone ketone, or a blend of polyether ether ketone and polyether ketone ketone.

In one example, the thermoplastic substrate 110 of the method 600 includes a polyaryletherketone polymer 118. Further, in one or more examples, the polyaryletherketone polymer of the thermoplastic composition 120' and the polyaryletherketone polymer of the thermoplastic substrate 110 are one and the same.

Still referring to FIG. 6, the method 600 further includes co-consolidating 640 the thermoplastic composition with the thermoplastic substrate 110 to define a receiving surface 114. In one or more examples, the co-consolidating 640 is performed at a temperature of about 275° C. to about 400° C. In another example, the co-consolidating 640 is performed at a temperature of about 330° C. to 400° C. In yet another example, the co-consolidating 640 is performed at a temperature of at least 340° C. The co-consolidating 640 may include any means including compression molding or stamp forming.

Figure 5:
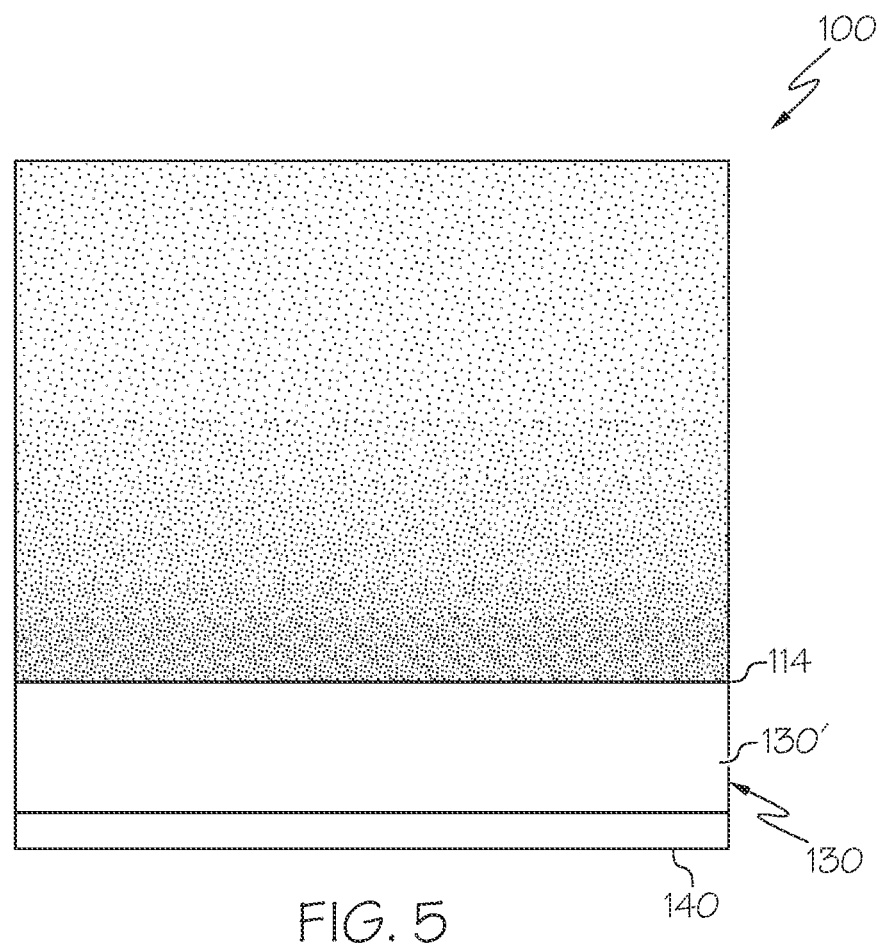
FIG. 5 is a cross sectional schematic of the laminate structure of FIG. 4 with an additional coating.

The method 600 may further include applying 650 a thermoset material 130', such as a thermoset coating 130, to the receiving surface 114. In one example, the thermoset material 130' of the method 600 includes an epoxy. In another example, the thermoset material 130' of the method 600 is a primer, such as a paint primer. Referring to FIG. 5, the method 600 may further include applying 560 a top coat 140 to the thermoset material 130'. In one example, the top coat 140 includes polyurethane.

Still referring to FIG. 6, the method 600 may further include, prior to the applying 630, extruding 620 the thermoplastic polymer 116 and the polyaryletherketone polymer 118 to yield the thermoplastic composition 120'. The extruding 620 may include extruding 620 the thermoplastic composition 120' to a thermoplastic film 120.

The method 600 may further include, prior to the applying 630, arranging 610 at least two plies 110' of laminate in a stacked configuration to yield the thermoplastic substrate 110. The arranging 610 may be performed by any suitable means of arranging plies of laminate. The at least two plies 110' of laminate may include at least one of polyether ether ketone and polyether ketone ketone, or a blend thereof.

Figure 7:
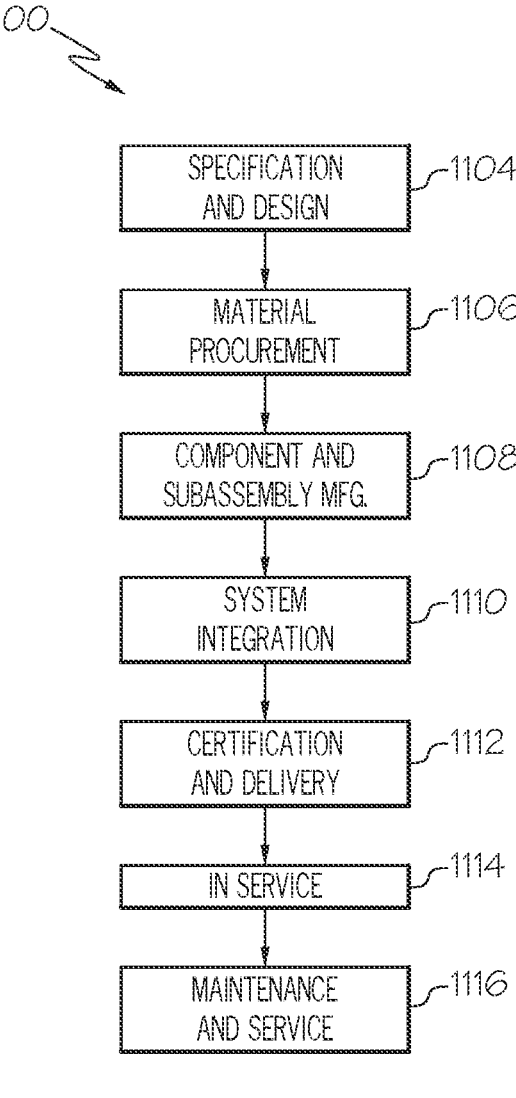
FIG. 7 is a block diagram of aircraft production and illustrative methodology.
Figure 8:
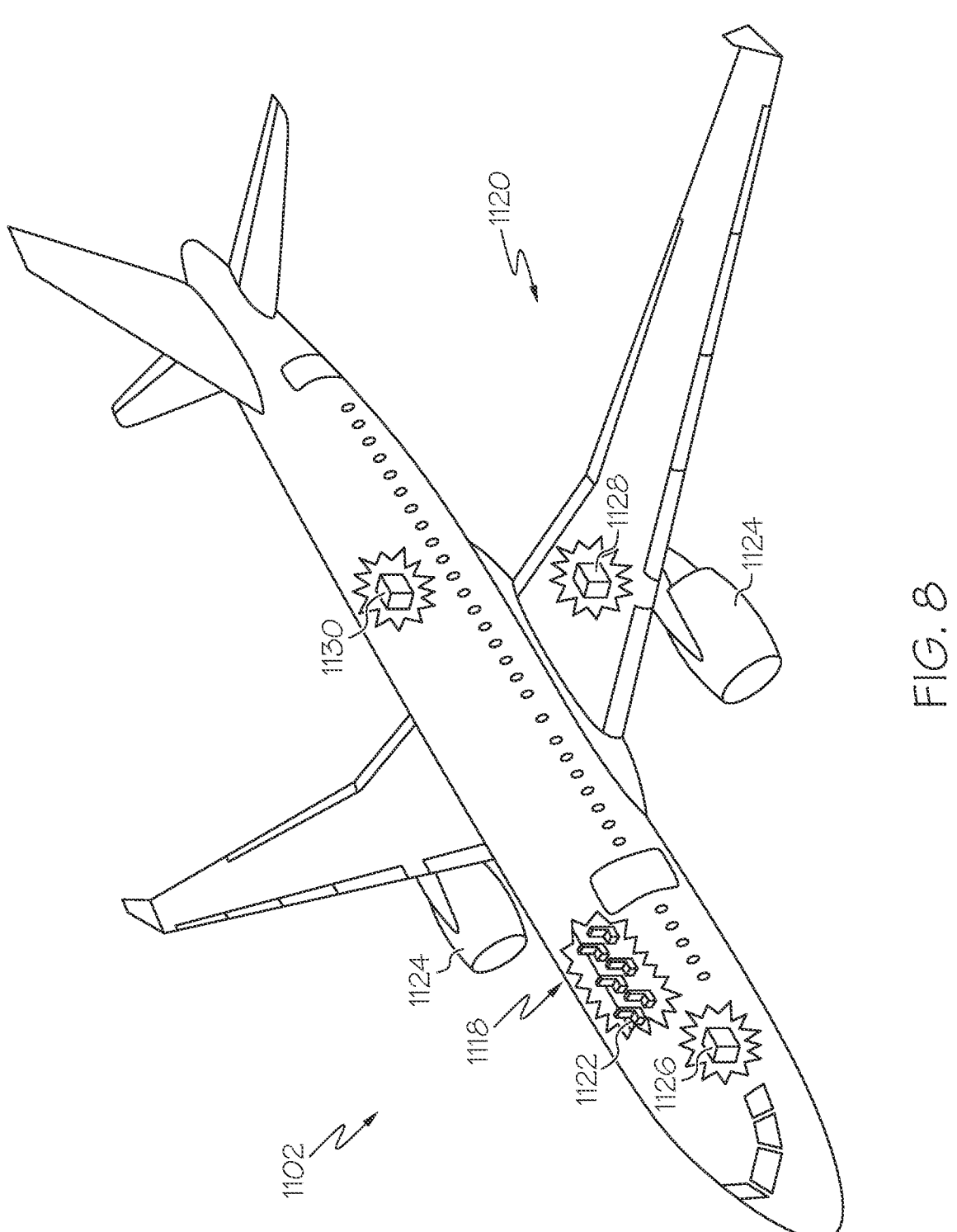
FIG. 8 is a schematic illustration of an aircraft.

Referring to FIG. 7 and FIG. 8, the disclosed consolidated laminate structure 100, thermoplastic composition 120' and method 600 will be used in the context of aircraft manufacturing and service including material procurement (block 1106), production, component and subassembly manufacturing (block 1108), and certification and delivery (block 1112) of aircraft 1102.

Examples of the subject matter disclosed herein may be described in the context of aircraft manufacturing and illustrative method 1100 as shown in FIG. 7 and aircraft 1102 as shown in FIG. 8. In one or more examples, the consolidated laminate structure 100 comprises a stringer assembly used in aircraft manufacturing. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

The thermoplastic composition 120' and the resulting film 120 can also be formulated to form a structural composite joint between a thermoplastic substrate and a thermoset component. The illustrative examples provide methods of forming composite joints between a thermoplastic composite component and a thermoset composite component using a thermoplastic joining film formed of the thermoplastic composition 120'.

Figure 9:
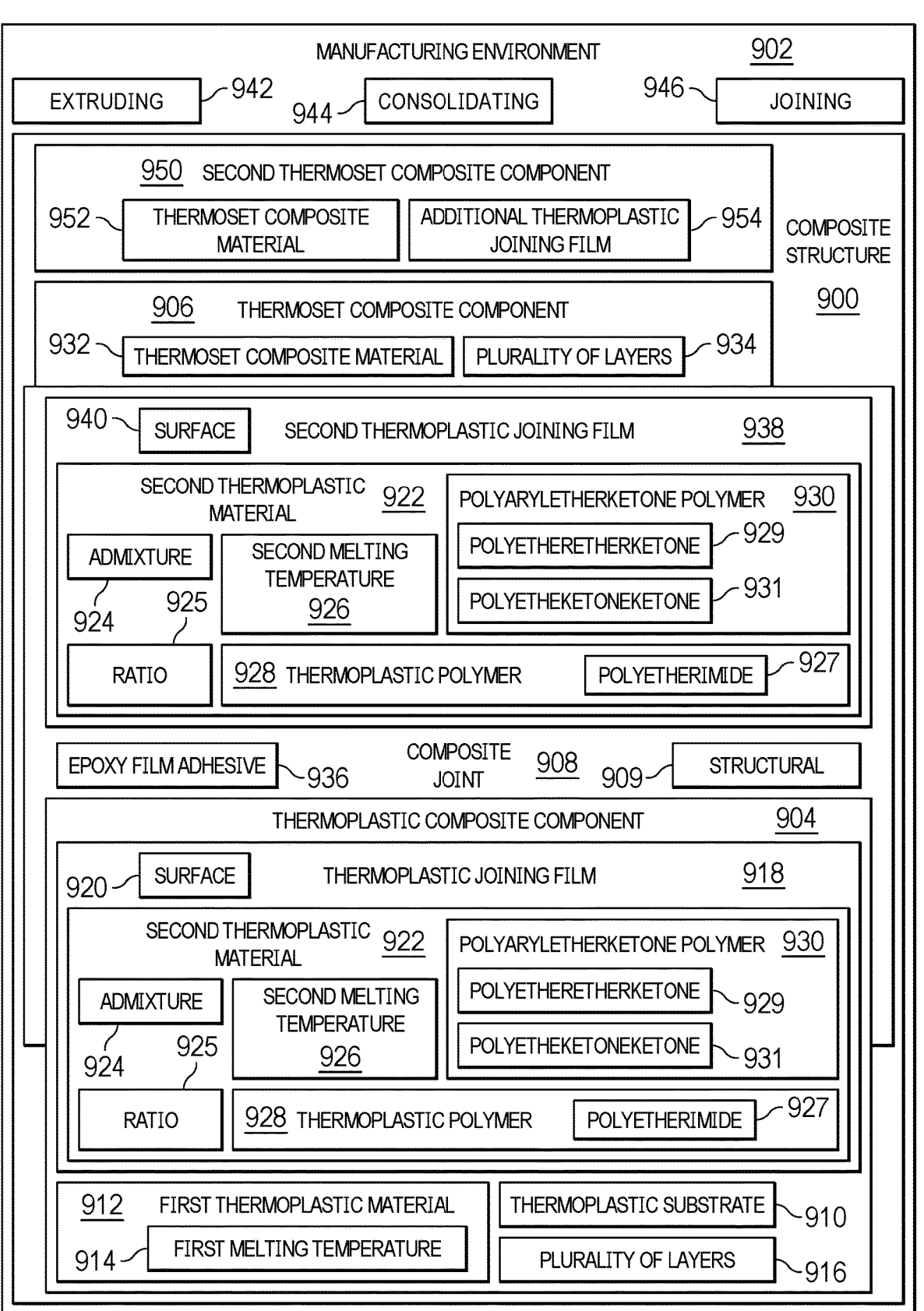
FIG. 9 is an illustration of a block diagram of a manufacturing environment in accordance with an illustrative embodiment.

Turning now to FIG. 9, a composite structure 900 can be formed in manufacturing environment 902. Composite structure 900 comprises thermoplastic composite component 904 and thermoset composite component 906 joined by composite joint 908. In these illustrative examples, composite joint 908 is structural 909. In some illustrative examples, by being structural 909, composite joint 908 has desirable strength and other properties for a joint to carry loads. In some illustrative examples, by being structural 909, composite joint 908 has desirable material properties to provide functionality of the joint.

Composite materials are tough, light-weight materials created by combining two or more functional components. For example, a composite material may include reinforcing fibers bound in polymer resin matrix. The fibers may be unidirectional or may take the form of a woven cloth or fabric.

Thermoplastic composite component 904 comprises thermoplastic substrate 910 and thermoplastic joining film 918 co-consolidated on thermoplastic substrate 910. Thermoplastic substrate 910 is a thermoplastic fiber composite. In some illustrative examples, thermoplastic substrate 910 comprises a thermoplastic polymer and a fiber material, such as carbon fiber. Thermoplastic composite component 904 comprises first thermoplastic material 912 with first melting temperature 914. In some illustrative examples, thermoplastic substrate 910 is formed of plurality of layers 916 of first thermoplastic material 912.

Thermoplastic joining film 918 is co-consolidated to thermoplastic substrate 910 to form surface 920 of thermoplastic composite component 904. Thermoplastic joining film 918 is formed of the thermoplastic composition 120' and is an implementation of film 120 of FIG. 1. Thermoplastic joining film 918 is formed of second thermoplastic material 922.

Thermoplastic joining film 918 comprises admixture 924 of thermoplastic polymer 928 and polyaryletherketone polymer 930 in ratio 925. Ratio 925 is in the range of 15:85 to 30:70 thermoplastic polymer 928 to polyaryletherketone polymer 930. Second thermoplastic material 922 has second melting temperature 926.

In some illustrative examples, thermoplastic polymer 928 is polyetherimide 927. In some illustrative examples, polyaryletherketone polymer 930 comprises at least one of polyetheretherketone 929 or polyetherketoneketone 931.

Thermoset composite component 906 is formed of plurality of layers 934 of thermoset composite material 932. Thermoset composite material 932 comprises a thermoset resin or epoxy along with reinforcing fibers. Thermoset composite material 932 can be provided in any desirable form, such as a prepreg composite material.

In some illustrative examples, thermoset composite component 906 is provided in an uncured state. In some illustrative examples, thermoset composite component 906 is cured during joining to thermoplastic composite component 904. In these illustrative examples, thermoplastic joining film 918 is in contact with thermoset composite material 932 of thermoset composite component 906 during curing of thermoset composite component 906. In some illustrative examples, heat of 180 degrees Celsius to 220 degrees Celsius is applied to join thermoplastic composite component 904 and thermoset composite component 906.

When thermoset composite component 906 is cured against thermoplastic joining film 918, thermoset composite material 932 diffuses into thermoplastic joining film 918 and second thermoplastic material 922 diffuses into thermoset composite component 906.

In some illustrative examples, thermoset composite component 906 is provided in a cured state. In these illustrative examples, thermoset composite component 906 is cured prior to joining to thermoplastic composite component 904.

When thermoset composite component 906 is cured prior to joining to thermoplastic composite component 904, additional layers of joining material are placed between thermoset composite component 906 and thermoplastic composite component 904. In some illustrative examples, epoxy film adhesive 936 is positioned between thermoplastic joining film 918 and thermoset composite component 906. In these illustrative examples, second thermoplastic material 922 diffuses into epoxy film adhesive 936 and epoxy film adhesive 936 diffuses into thermoplastic joining film 918.

In some illustrative examples, second thermoplastic joining film 938 is attached to thermoset composite material 932 to form surface 940 of thermoset composite component 906. In these illustrative examples, second thermoplastic joining film 938, epoxy film adhesive 936, and thermoplastic joining film 918 form composite joint 908 between thermoset composite material 932 and thermoplastic substrate 910.

Second thermoplastic joining film 938 is formed of the thermoplastic composition 120' and is an implementation of film 120 of FIG. 1. Second thermoplastic joining film 938 is formed of second thermoplastic material 922.

Second thermoplastic joining film 938 comprises admixture 924 of thermoplastic polymer 928 and polyaryletherketone polymer 930 in ratio 925. Ratio 925 is in the range of 15:85 to 30:70 thermoplastic polymer 928 to polyaryletherketone polymer 930. Second thermoplastic material 922 has second melting temperature 926.

In some illustrative examples, thermoplastic polymer 928 is polyetherimide 927. In some illustrative examples, polyaryletherketone polymer 930 comprises at least one of polyetheretherketone 929 or polyetherketoneketone 931.

To form composite joint 908, extruding 942, consolidating 944, and joining 946 are performed. First, thermoplastic joining film 918 and optionally second thermoplastic joining film 938 are formed through extruding 942 thermoplastic polymer 928 and polyaryletherketone polymer 930. After forming thermoplastic joining film 918 and optionally second thermoplastic joining film 938, consolidating 944 is performed. Thermoplastic joining film 918 is co-consolidated to thermoplastic substrate 910. When formed, second thermoplastic joining film 938 is joined to thermoset composite material 932 through curing. Afterwards, joining 946 of thermoset composite component 906 and thermoplastic composite component 904 is performed using thermoplastic joining film 918 and optionally at least one of epoxy film adhesive 936 or second thermoplastic joining film 938.

In some illustrative examples, thermoplastic joining films can be used to join thermoset composite components to each other. In some illustrative examples, thermoset composite component 906 can be joined to second thermoset composite component 950 using second thermoplastic joining film 938. To join thermoset composite component 906 and second thermoset composite component 950, composite joint 908 can be formed in a plurality of different ways.

In some illustrative examples, only second thermoplastic joining film 938 is present in composite joint 908 between thermoset composite component 906 and second thermoset composite component 950. In some illustrative examples, second thermoplastic joining film 938 and epoxy film adhesive 936 are present in composite joint 908 between thermoset composite component 906 and second thermoset composite component 950. In some illustrative examples, second thermoplastic joining film 938, epoxy film adhesive 936, and additional thermoplastic joining film 954 are present in composite joint 908 between thermoset composite component 906 and second thermoset composite component 950. In some illustrative examples, only additional thermoplastic joining film 954 is present in composite joint 908 between thermoset composite component 906 and second thermoset composite component 950.

When only second thermoplastic joining film 938 is present in composite joint 908, thermoset composite component 906 and second thermoset composite component 950 are cured while in contact with second thermoplastic joining film 938. In these illustrative examples, thermoplastic polymer 928 and polyaryletherketone polymer 930 have diffused into thermoset composite component 906 while curing thermoset composite component 906. In these illustrative examples, thermoset composite material 932 diffuses into second thermoplastic joining film 938. In these illustrative examples, thermoplastic polymer 928 and polyaryletherketone polymer 930 have diffused into second thermoset composite component 950 while curing second thermoset composite component 950. In these illustrative examples, thermoset composite material 952 diffuses into second thermoplastic joining film 938.

When second thermoplastic joining film 938 and epoxy film adhesive 936 are present in composite joint 908, thermoset composite component 906 is cured while in contact with second thermoplastic joining film 938 and epoxy film adhesive 936 is used to join to second thermoset composite component 950 afterwards. In these illustrative examples, thermoplastic polymer 928 and polyaryletherketone polymer 930 have diffused into thermoset composite component 906 while curing thermoset composite component 906. In these illustrative examples, thermoset composite material 932 diffuses into second thermoplastic joining film 938. Second thermoset composite component 950 is provided in a cured state. After curing thermoset composite component 906, epoxy film adhesive 936 is applied to second thermoplastic joining film 938 and second thermoset composite component 950. A joining temperature in the range of 180 degrees Celsius to 220 degrees Celsius is applied to epoxy film adhesive 936 and second thermoplastic joining film 938 to form composite joint 908. In these illustrative examples, epoxy film adhesive 936 has diffused into second thermoplastic joining film 938 and thermoplastic polymer 928 and polyaryletherketone polymer 930 have diffused into epoxy film adhesive 936.

When additional thermoplastic joining film 954 and epoxy film adhesive 936 are present in composite joint 908, second thermoset composite component 950 is cured while in contact with additional thermoplastic joining film 954 and epoxy film adhesive 936 is used to join to thermoset composite component 906 afterwards. In these illustrative examples, thermoplastic polymer 928 and polyaryletherketone polymer 930 have diffused into second thermoset composite component 950 while curing thermoset composite material 952 of second thermoset composite component 950. In these illustrative examples, thermoset composite material 952 diffuses into additional thermoplastic joining film 954. Thermoset composite component 906 is provided in a cured state. After curing second thermoset composite component 950, epoxy film adhesive 936 is applied to additional thermoplastic joining film 954 and thermoset composite component 906. A joining temperature in the range of 180 degrees Celsius to 220 degrees Celsius is applied to epoxy film adhesive 936 and additional thermoplastic joining film 954 to form composite joint 908. In these illustrative examples, epoxy film adhesive 936 has diffused into second thermoplastic joining film 938 and thermoplastic polymer 928 and polyaryletherketone polymer 930 have diffused into epoxy film adhesive 936.

In some illustrative examples, second thermoplastic joining film 938, epoxy film adhesive 936, and additional thermoplastic joining film 954 are present in composite joint 908 between thermoset composite component 906 and second thermoset composite component 950. Thermoset composite component 906 is cured while in contact with second thermoplastic joining film 938. In these illustrative examples, thermoplastic polymer 928 and polyaryletherketone polymer 930 have diffused into thermoset composite component 906 while curing thermoset composite component 906. In these illustrative examples, thermoset composite material 932 diffuses into second thermoplastic joining film 938. Second thermoset composite component 950 is cured while in contact with additional thermoplastic joining film 954. In these illustrative examples, thermoplastic polymer 928 and polyaryletherketone polymer 930 have diffused into second thermoset composite component 950 while curing thermoset composite material 952 of second thermoset composite component 950. In these illustrative examples, thermoset composite material 952 diffuses into additional thermoplastic joining film 954. In these illustrative examples, epoxy film adhesive 936 is placed between second thermoplastic joining film 938 and additional thermoplastic joining film 945. A joining temperature in the range of 180 degrees Celsius to 220 degrees Celsius is applied to epoxy film adhesive 936, second thermoplastic joining film 938, and additional thermoplastic joining film 954 to form composite joint 908. In these illustrative examples, epoxy film adhesive 936 has diffused into second thermoplastic joining film 938 and additional thermoplastic joining film 954. Thermoplastic polymer 928 and polyaryletherketone polymer 930 have diffused into epoxy film adhesive 936.

By using thermoplastic joining films to join together two thermoset composite components, sanding and other surface preparations can be reduced. By joining together two thermoset composite components using thermoplastic joining films, debris generated by surface preparations is reduced. By joining together two thermoset composite components using thermoplastic joining films, processing time can be reduced.

The illustration of manufacturing environment 902 in FIG. 9 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, instead of epoxy film adhesive 936, a low-melt PAEK film can be present between thermoplastic joining film 918 and second thermoplastic joining film 938. As another example, although not depicted in FIG. 9, first thermoplastic material 912 comprises one of polyetherketoneketone (PEKK), polyetheretherketone (PEEK), or a blend of polyetheretherkeone (PEEK) and polyetherketoneketone (PEKK).

Turning now to FIG. 10, a flowchart of a method of manufacturing a composite structure is depicted in accordance with an illustrative embodiment. Method 1000 can be used to form composite joint 908 in composite structure 900 of FIG. 9. Method 1000 can be used to form a composite structure from thermoset composite component 1202 and thermoplastic composite component 1204 of FIG. 11. Method 1000 can be used to form a composite structure from thermoset composite component 1302 and thermoplastic composite component 1304 of FIG. 12. Method 1000 can be used to form a composite structure from thermoset composite component 1402 and thermoplastic composite component 1404 of FIG. 13.

Method 1000 positions a thermoplastic composite component with a surface formed of thermoplastic joining film relative to a thermoset composite component such that the thermoplastic joining film is between a thermoplastic substrate of the thermoplastic composite component and the thermoset composite component (operation 1002). Method 1000 applies heat lower than a melting temperature of the thermoplastic joining film to the thermoplastic joining film to form a composite joint between the thermoplastic composite component and the thermoset composite component (operation 1004).

In some illustrative examples, method 1000 extrudes a thermoplastic polymer and a polyaryletherketone polymer to yield the thermoplastic joining film (operation 1006). In some illustrative examples, method 1000 co-consolidates the thermoplastic joining film with the thermoplastic substrate to define the surface of the thermoplastic composite component (operation 1008).

In some illustrative examples, method 1000 cures the thermoset composite material with a second thermoplastic joining film to form the thermoset composite component (operation 1010). In these illustrative examples, the second thermoplastic joining film forms a surface of the thermoset composite component prior to joining with the thermoplastic composite component.

In some illustrative examples, the co-consolidating is performed at a temperature of about 330° C. to about 400° C. (operation 1012). In some illustrative examples, the co-consolidating is performed at a temperature of at least 340° C. (operation 1014). In some illustrative examples, the co-consolidating comprises compression molding (operation 1016).

In some illustrative examples, method 1000 applies an epoxy film adhesive between the thermoplastic joining film and the thermoset composite component, wherein applying the heat to the thermoplastic joining film diffuses the second thermoplastic material of the thermoplastic joining film into the epoxy film adhesive and diffuses the epoxy film adhesive into the thermoplastic joining film (operation 1018).

In some illustrative examples, applying heat comprises applying heat in the range of about 180 degrees Celsius to about 220 degrees Celsius to the thermoplastic joining film (operation 1020).

In some illustrative examples, the thermoset composite component is an uncured thermoset composite material, curing the thermoset composite material such that curing the thermoset composite material applies the heat lower than the melting temperature of the thermoplastic joining film to the thermoplastic joining film to form the composite joint. (operation 1022). In some illustrative examples, method 1000 applies pressure to the thermoplastic composite component and thermoset composite component while heating the thermoplastic joining film (operation 1024).

Figure 11:
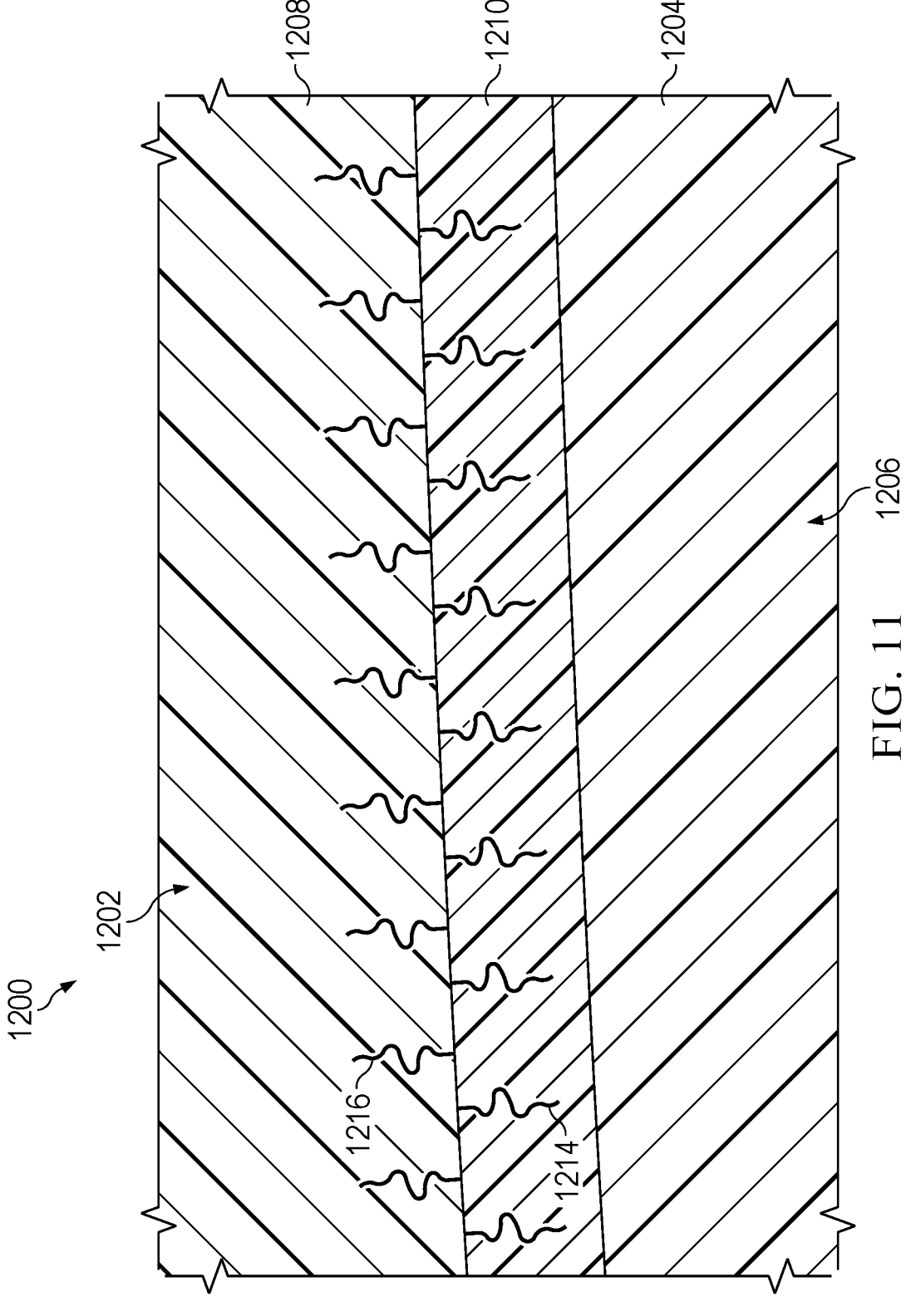
FIG. 11 is an illustration of a composite joint between a thermoplastic composite component and a thermoset composite component in accordance with an illustrative embodiment.

Turning now to FIG. 11, an illustration of a composite joint between a thermoplastic composite component and a thermoset composite component is depicted in accordance with an illustrative embodiment. In view 1200, thermoset composite component 1202 is joined to thermoplastic composite component 1204 by thermoplastic joining film 1210. Thermoset composite component 1202 is a physical implementation of thermoset composite component 906 of FIG. 9. Thermoplastic composite component 1204 is a physical implementation of thermoplastic composite component 904 of FIG. 9. Thermoplastic joining film 1210 is a physical implementation of thermoplastic joining film 918 of FIG. 9. Thermoplastic joining film 1210 is a physical implementation of film 120 of FIG. 1. Thermoplastic joining film 1210 is formed of an admixture of two different thermoplastic materials. Thermoplastic joining film 1210 is formed of a thermoplastic polymer and a polyaryletherketone polymer in an admixture. In some illustrative examples, thermoplastic joining film 1210 is formed of a mixture of polyetherimide and a polyaryletherketone.

Thermoplastic joining film 1210 has a second melting temperature lower than a first melting temperature of first thermoplastic material 1206 forming thermoplastic composite component 1204. Thermoplastic joining film 1210 has been co-consolidated to first thermoplastic material 1206 to form thermoplastic composite component 1204. Thermoplastic composite component 1204 is an implementation of consolidated laminate structure 100 of FIG. 3.

Thermoplastic joining film 1210 is configured with material properties selected to provide a structural joint between thermoset composite component 1202 and thermoplastic composite component 1204. In some illustrative examples, thermoplastic joining film 1210 has a glass transition temperature in the range of 140-220 degrees Celsius. In some illustrative examples, first thermoplastic material 1206 is one of polyetherketoneketone (PEKK), polyetheretherketone (PEEK), or a blend of polyetheretherkeone (PEEK) and polyetherketoneketone (PEKK).

To join thermoset composite component 1202 to thermoplastic composite component 1204, heat and pressure are applied to thermoset composite component 1202 and thermoplastic composite component 1204. The joining temperature applied to thermoset composite component 1202 and thermoplastic composite component 1204 is less than the melting temperature of first thermoplastic material 1206. The joining temperature used is configured to maintain consolidation of thermoplastic composite component 1204. In some illustrative examples, joining can be performed at a temperature in the range of 180-200 degrees Celsius to join thermoset composite component 1202 and thermoplastic composite component 1204.

During joining, thermoset composite material 1208 of thermoset composite component has diffused 1214 into thermoplastic joining film 1210. During joining, second thermoplastic material of thermoplastic joining film 1210 has diffused 1216 into thermoset composite component 1202. To create diffusions of thermoset composite material 1208 of thermoset composite component 1202 into thermoplastic joining film 1210, thermoset composite component 1202 is provided as an uncured epoxy composite material, such as a liquid molded or B-staged resin. In some illustrative examples, the epoxy composite material of thermoset composite component 1202 is cured during the joining to form the diffusions. In some illustrative examples, the diffusion of the polymer chain from thermoplastic joining film 1210 to thermoset composite material 1208, such as epoxy composites or epoxy film adhesive, happens during the curing step of thermoset composite material 1208.

Figure 12:
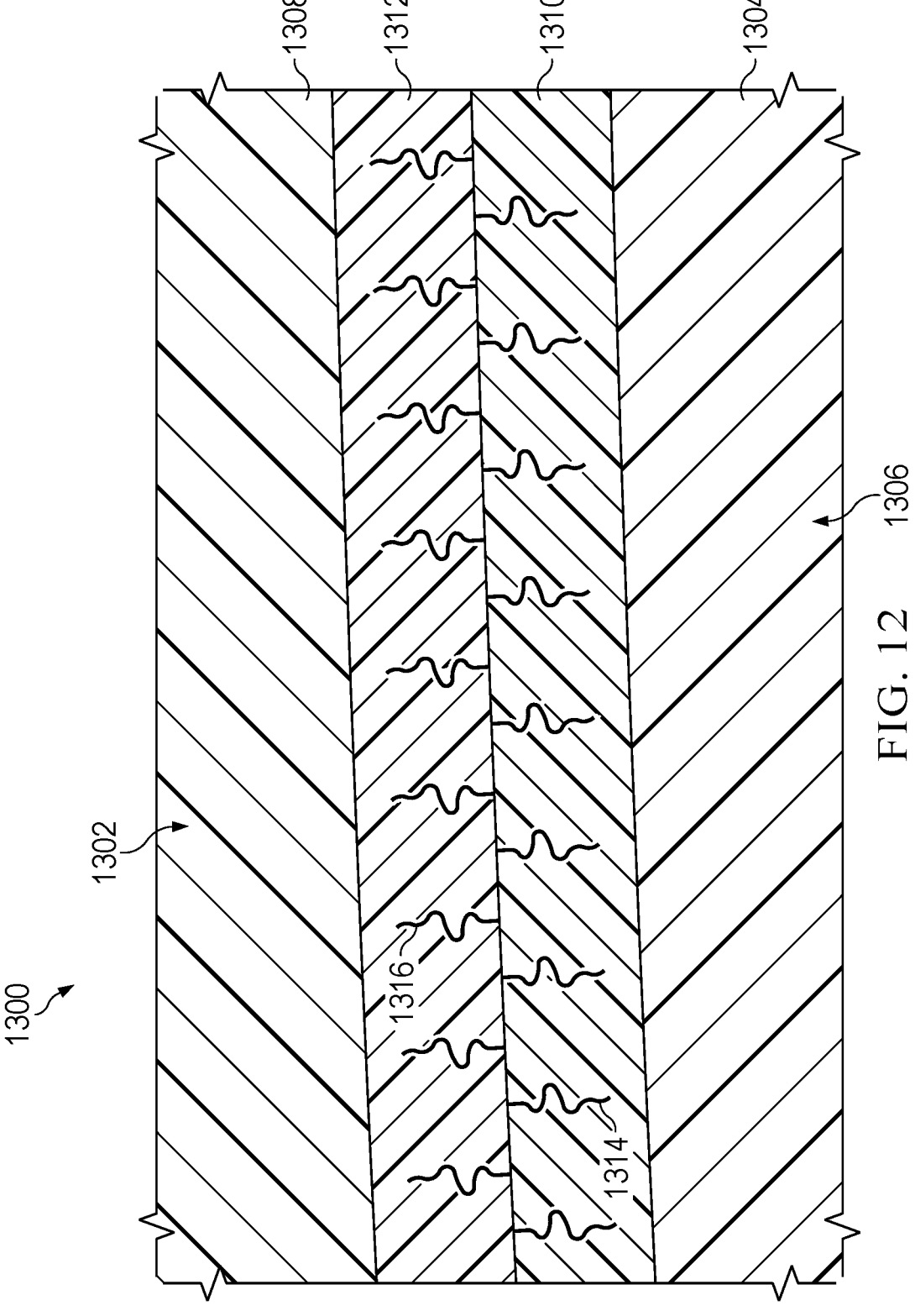
FIG. 12 is an illustration of a composite joint between a thermoplastic composite component and a thermoset composite component in accordance with an illustrative embodiment.

Turning now to FIG. 12, an illustration of a composite joint between a thermoplastic composite component and a thermoset composite component is depicted in accordance with an illustrative embodiment. In view 1300, thermoset composite component 1302 is joined to thermoplastic composite component 1304 by thermoplastic joining film 1310 and epoxy film adhesive 1312. In this illustrative example, thermoset composite component 1302 is cured prior to joining. Thermoset composite component 1302 is a physical implementation of thermoset composite component 906 of FIG. 9. Thermoplastic composite component 1304 is a physical implementation of thermoplastic composite component 904 of FIG. 9. Thermoplastic joining film 1310 is a physical implementation of thermoplastic joining film 918 of FIG. 9. Thermoplastic joining film 1310 is a physical implementation of film 130 of FIG. 1. Thermoplastic joining film 1310 is formed of an admixture of two different thermoplastic materials. Thermoplastic joining film 1310 is formed of a thermoplastic polymer and a polyaryletherketone polymer in an admixture. In some illustrative examples, thermoplastic joining film 1310 is formed of a mixture of polyetherimide and a polyaryletherketone.

Thermoplastic joining film 1310 has a second melting temperature lower than a first melting temperature of first thermoplastic material 1306 forming thermoplastic composite component 1304. Thermoplastic joining film 1310 has been co-consolidated to first thermoplastic material 1306 to form thermoplastic composite component 1304. Thermoplastic composite component 1304 is an implementation of consolidated laminate structure 100 of FIG. 3.

Thermoplastic joining film 1310 is configured with material properties selected to provide a structural joint between thermoset composite component 1302 and thermoplastic composite component 1304. In some illustrative examples, thermoplastic joining film 1310 has a glass transition temperature in the range of 140-220 degrees Celsius. In some illustrative examples, first thermoplastic material 1306 is one of polyetherketoneketone (PEKK), polyetheretherketone (PEEK), or a blend of polyetheretherkeone (PEEK) and polyetherketoneketone (PEKK).

To join thermoset composite component 1302 to thermoplastic composite component 1304, heat and pressure are applied to thermoset composite component 1302 and thermoplastic composite component 1304. The joining temperature applied to thermoset composite component 1302 and thermoplastic composite component 1304 is less than the melting temperature of first thermoplastic material 1306. The joining temperature used is configured to maintain consolidation of thermoplastic composite component 1304. In some illustrative examples, joining can be performed at a temperature in the range of 180-200 degrees Celsius to join thermoset composite component 1302 and thermoplastic composite component 1304.

Thermoplastic joining film 1310 and epoxy film adhesive 1312 form a joint between thermoset composite component 1302 and thermoplastic composite component 1304. During joining, epoxy film adhesive 1312 has diffused 1314 into thermoplastic joining film 1310. During joining, second thermoplastic material of thermoplastic joining film 1310 has diffused 1316 into epoxy film adhesive 1312.

Figure 13:
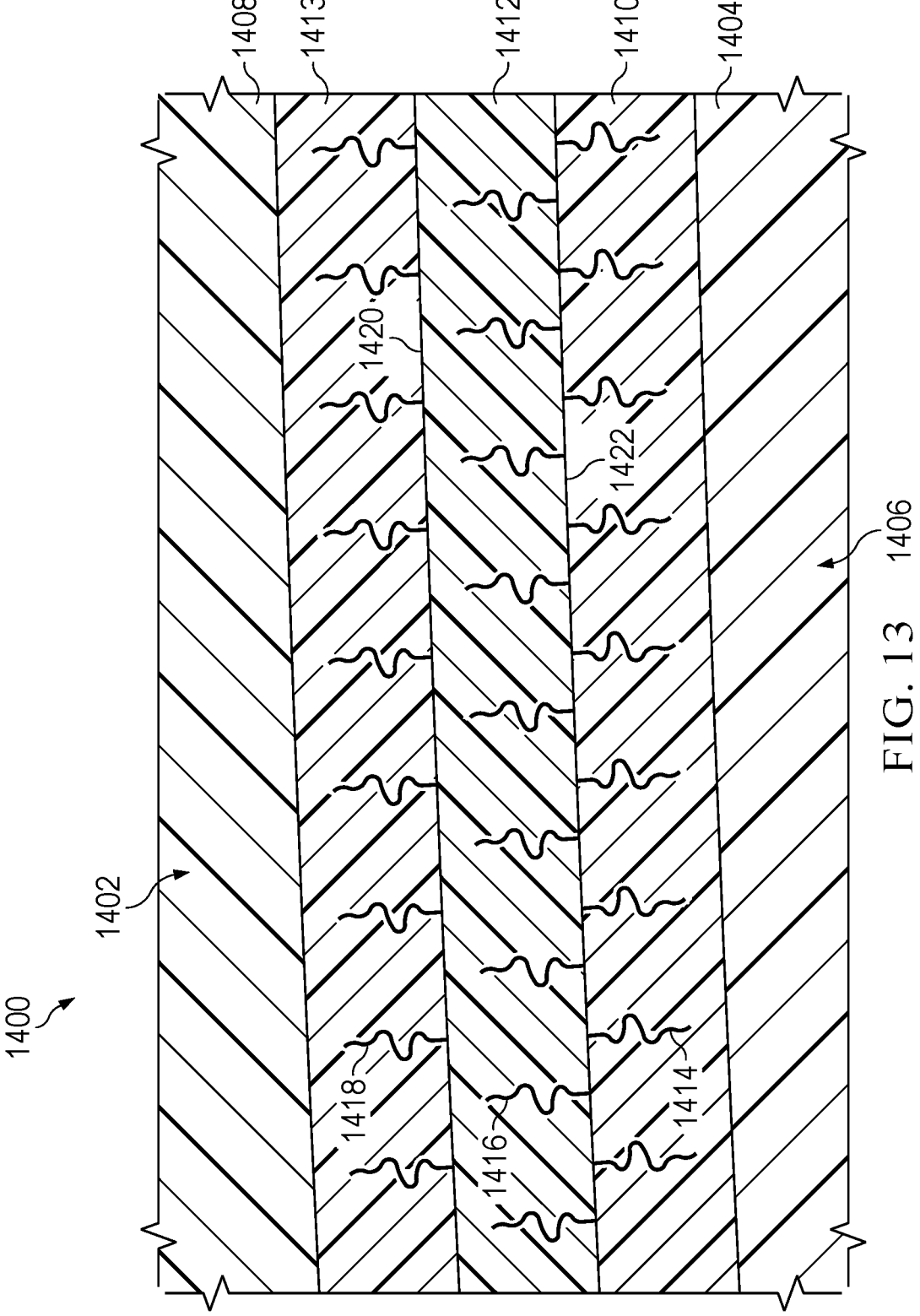
FIG. 13 is an illustration of a composite joint between a thermoplastic composite component and a thermoset composite component in accordance with an illustrative embodiment.

Turning now to FIG. 13, an illustration of a composite joint between a thermoplastic composite component and a thermoset composite component is depicted in accordance with an illustrative embodiment. In view 1400, thermoset composite component 1402 is joined to thermoplastic composite component 1404 by thermoplastic joining film 1410, epoxy film adhesive 1412, and thermoplastic joining film 1413. In this illustrative example, thermoset composite component 1402 is cured prior to joining. Thermoset composite component 1402 is a physical implementation of thermoset composite component 906 of FIG. 9. Thermoplastic composite component 1404 is a physical implementation of thermoplastic composite component 904 of FIG. 9. Thermoplastic joining film 1410 is a physical implementation of thermoplastic joining film 918 of FIG. 9. Thermoplastic joining film 1413 is a physical implementation of second thermoplastic joining film 938 of FIG. 9. Thermoplastic joining film 1410 and thermoplastic joining film 1413 are physical implementations of film 140 of FIG. 1. Thermoplastic joining film 1410 and thermoplastic joining film 1413 are formed of an admixture of two different thermoplastic materials. Thermoplastic joining film 1410 and Thermoplastic joining film 1413 are formed of a thermoplastic polymer and a polyaryletherketone polymer in an admixture. In some illustrative examples, thermoplastic joining film 1410 and thermoplastic joining film 1413 are formed of a mixture of polyetherimide and a polyaryletherketone.

Thermoplastic joining film 1410 and thermoplastic joining film 1413 each have a second melting temperature lower than a first melting temperature of first thermoplastic material 1406 forming thermoplastic composite component 1404. Thermoplastic joining film 1410 has been co-consolidated to first thermoplastic material 1406 to form thermoplastic composite component 1404. Thermoplastic joining film 1413 is joined to thermoset composite component 1402 prior to joining thermoset composite component 1402 to thermoplastic composite component 1404. Thermoplastic composite component 1404 is an implementation of consolidated laminate structure 100 of FIG. 3.

Thermoplastic joining film 1410 and thermoplastic joining film 1413 are configured with material properties selected to provide a structural joint between thermoset composite component 1402 and thermoplastic composite component 1404. In some illustrative examples, thermoplastic joining film 1410 and thermoplastic joining film 1413 have a glass transition temperature in the range of 140-220 degrees Celsius. In some illustrative examples, first thermoplastic material 1406 is one of polyetherketoneketone (PEKK), polyetheretherketone (PEEK), or a blend of polyetheretherkeone (PEEK) and polyetherketoneketone (PEKK).

To join thermoset composite component 1402 to thermoplastic composite component 1404, heat and pressure are applied to thermoset composite component 1402 and thermoplastic composite component 1404. The joining temperature applied to thermoset composite component 1402 and thermoplastic composite component 1404 is less than the melting temperature of first thermoplastic material 1406. The joining temperature used is configured to maintain consolidation of thermoplastic composite component 1404. In some illustrative examples, joining can be performed at a temperature in the range of 180-200 degrees Celsius to join thermoset composite component 1402 and thermoplastic composite component 1404.

Thermoplastic joining film 1410, epoxy film adhesive 1412, and thermoplastic joining film 1413 form a joint between thermoset composite component 1402 and thermoplastic composite component 1404.

In this illustrative example, thermoplastic joining film 1410 forms surface 1422 of thermoplastic composite component 1404. In this illustrative example, thermoplastic joining film 1413 forms surface 1420 of thermoset composite component 1402.

During the joining, epoxy film adhesive 1412 has diffused 1414 into thermoplastic joining film 1410. Epoxy film adhesive 1412 has diffused 1418 into thermoplastic joining film 1413. During joining, second thermoplastic material of thermoplastic joining film 1410 and thermoplastic joining film 1413 has diffused 1416 into epoxy film adhesive 1412.

Apparatus(es) and method(s) shown or described herein may be employed during any one or more of the stages of the manufacturing and illustrative method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages component and subassembly manufacturing (block 1108) and system integration (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the composition(s), structure(s) and method(s) disclosed herein include a variety of components, features, and functionalities. It should be understood that the various examples of composition(s), structure(s) and method(s), disclosed herein, may include any of the components, features, and functionalities of any of the other examples of the composition(s), structure(s) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

Clause 1. A thermoplastic composition (120') comprising: a thermoplastic polymer (116); and a polyaryletherketone polymer (118) in admixture with the thermoplastic polymer (116). Clause 2: The thermoplastic composition (120') of Clause 1 wherein the thermoplastic polymer (116) comprises polyetherimide. Clause 3. The thermoplastic composition (120') of Clause 1 wherein the polyaryletherketone polymer (118) comprises polyether ether ketone. Clause 4. The thermoplastic composition (120') of Clause 1 wherein the polyaryletherketone polymer (118) comprises polyether ketone ketone. Clause 5. The thermoplastic composition (120') of Clause 1 wherein the polyaryletherketone polymer (118) comprises a blend of at least two polyaryletherketones. Clause 6. The thermoplastic composition (120') of Clause 1 wherein the polyaryletherketone polymer (118) comprises a blend of polyether ketone ketone and polyether ether ketone. Clause 7. The thermoplastic composition (120') of Clause 1 wherein a ratio of the thermoplastic polymer (116) to the polyaryletherketone polymer (118) is between about 20:80 and about 50:50. Clause 8. The thermoplastic composition (120') of Clause 1 wherein a ratio of the thermoplastic polymer (116) to the polyaryletherketone polymer (118) is between about 10:90 and about 50:50. Clause 9. The thermoplastic composition (120') of Clause 1 comprising a degree of crystallinity from about 1 percent to about 30 percent. Clause 10. The thermoplastic composition (120') of Clause 1 comprising a degree of crystallinity from about 2 percent to about 15 percent. Clause 11. The thermoplastic composition (120') of Clause 1 comprising a degree of crystallinity from about 3 percent to about 10 percent. Clause 12. The thermoplastic composition (120') of Clause 1 wherein the polyaryletherketone polymer (118) has a melting temperature of about 275° C. to about 350° C. Clause 13. The thermoplastic composition (120') of Clause 1 wherein the polyaryletherketone polymer (118) has a melting temperature of at least about 300° C. Clause 14. The thermoplastic composition (120') of Clause 1 further comprising a heat stabilizer. Clause 15. The thermoplastic composition (120') of Clause 1 further comprising a nucleating agent.

Clause 16. A film (120) comprising the thermoplastic composition (120') of Clause 1. Clause 17. The film (120) of Clause 16 comprising a thickness of about 1 mil to about 15 mil.

Clause 18. A consolidated laminate structure (100) comprising: a thermoplastic substrate (110) comprising a thermoplastic polymer; and a thermoplastic composition (120') consolidated with the thermoplastic substrate (110) to define a receiving surface (114), the thermoplastic composition (120') comprising: a thermoplastic polymer (116); and a polyaryletherketone polymer (118) in admixture with the thermoplastic polymer(116).

19. The consolidated laminate structure (100) of Clause 18 wherein the thermoplastic polymer (116) comprises polyetherimide.

20. The consolidated laminate structure (100) of Clause 18 wherein the polyaryletherketone polymer (118) comprises at least one of polyether ether ketone and polyether ketone ketone.

21. The consolidated laminate structure (100) of Clause 18 wherein a ratio of the thermoplastic polymer (116) to the polyaryletherketone polymer (118) is between about 10:90 and about 50:50.

22. The consolidated laminate structure (100) of Clause 18 further comprising a thermoset material (130') applied to the receiving surface (114).

23. The consolidated laminate structure (100) of Clause 22 wherein the thermoset material (130') comprises an epoxy.

24. The consolidated laminate structure (100) of Clause 22 wherein the thermoset material (130') is a primer.

25. The consolidated laminate structure (100) of Clause 24 further comprising a top coat (140) applied to the primer.

26. A method (600) for manufacturing a consolidated laminate structure (100), the method (600) comprising:

applying (630) a thermoplastic composition (120') to a first major surface (112) of a thermoplastic substrate (110), the thermoplastic composition comprises (120'):

a thermoplastic polymer (116); and a polyaryletherketone polymer (118) in admixture with the thermoplastic polymer (116); and co-consolidating (640) the thermoplastic composition (120') with the thermoplastic substrate (110) to define a receiving surface (114).

27. The method (600) of Clause 26 wherein the thermoplastic substrate (110) comprises a polyaryletherketone polymer (118).

28. The method (600) of Clause 27 wherein the polyaryletherketone polymer (118) of the thermoplastic composition (120') and the polyaryletherketone polymer (118) of the thermoplastic substrate (110) are one and the same.

29. The method (600) of Clause 26 wherein the thermoplastic substrate (110) comprises at least one of polyether ether ketone and polyether ketone ketone.

30. The method (600) of Clause 26 wherein the thermoplastic polymer (116) comprises polyetherimide.

31. The method (600) of Clause 26 wherein the polyaryletherketone polymer (118) comprises at least one of polyether ether ketone and polyether ketone ketone.

32. The method (600) of Clause 26 wherein the co-consolidating (640) is performed at a temperature of about 330° C. to about 400° C.

33. The method (600) of Clause 26 wherein the co-consolidating (640) is performed at a temperature of at least 340° C.

34. The method (600) of Clause 26 wherein the co-consolidating (640) comprises compression molding the thermoplastic composition (120') with the first major surface (112) of the thermoplastic substrate (110).

35. The method (600) of Clause 26 further comprising applying (650) a thermoset material (130') to the receiving surface (114).

36. The method (600) of Clause 35 wherein the thermoset material (130') comprises an epoxy.

37. The method (600) of Clause 26 further comprising, prior to the applying(630), extruding (620) the thermoplastic polymer (116) and the polyaryletherketone polymer (118) to yield the thermoplastic composition (120').

38. The method (600) of Clause 26 further comprising, prior to the applying (630), arranging (610) at least two plies (110') of laminate in a stacked configuration to yield the thermoplastic substrate (110).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1006 through operation 1024 may be optional.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite structure comprising:
a thermoset composite component;
a thermoplastic composite component formed of a single thermoplastic material of polyetheretherketon (PEEK) or polyetherketoneketone (PEKK); and
a thermoplastic joining film forming a structural composite joint between the thermoset composite component and the thermoplastic composite component, the thermoplastic joining film comprising a thermoplastic polymer and a polyaryletherketone polymer in admixture with the thermoplastic polymer.

2. The composite structure of claim 1 wherein the thermoplastic polymer comprises polyetherimide.

3. The composite structure of claim 1 wherein the polyaryletherketone polymer comprises at least one of polyether ether ketone or polyether ketone ketone.

4. The composite structure of claim 1 wherein the polyaryletherketone polymer comprises a blend of at least two polyaryletherketones.

5. The composite structure of claim 1 wherein a ratio of the thermoplastic polymer to the polyaryletherketone polymer is between about 15:85 and about 30:70.

6. The composite structure of claim 1 comprising a degree of crystallinity from about 1 percent to about 30 percent.

7. The composite structure of claim 1 comprising a degree of crystallinity from about 2 percent to about 15 percent.

8. The composite structure of claim 1 comprising a degree of crystallinity from about 3 percent to about 10 percent.

9. The composite structure of claim 1, wherein the thermoplastic polymer and the polyaryletherketone polymer have diffused into the thermoset composite component.

10. The composite structure of claim 1, wherein the thermoplastic joining film is co-consolidated to a thermoplastic substrate of the thermoplastic composite component.

11. The composite structure of claim 10 wherein a polyaryletherketone polymer of the thermoplastic joining film and the polyaryletherketone polymer of the thermoplastic substrate are the same.

12. The composite structure of claim 1 further comprising:
an epoxy film adhesive between the thermoplastic joining film and the thermoset composite component.

13. The composite structure of claim 12 further comprising:
a second thermoplastic joining film between the epoxy film adhesive and the thermoset composite component.

14. A method for manufacturing a composite structure comprising:
positioning a thermoplastic composite component with a surface formed of thermoplastic joining film relative to a thermoset composite component such that the thermoplastic joining film is between a thermoplastic substrate of the thermoplastic composite component and the thermoset composite component, wherein the thermoplastic composite component is formed of a single thermoplastic material of polyetheretherketon (PEEK) or polyetherketoneketone (PEKK) and the thermoplastic joining film comprises a thermoplastic polymer and a polyaryletherketone polymer in admixture with the thermoplastic polymer; and applying heat lower than a melting temperature of the thermoplastic joining film to the thermoplastic joining film to form a composite joint between the thermoplastic composite component and the thermoset composite component.

15. The method of claim 14, wherein applying heat comprises applying heat in a range of about 180 degrees Celsius to about 220 degrees Celsius to the thermoplastic joining film.

16. The method of claim 14, wherein the thermoset composite component is an uncured thermoset composite material, curing the thermoset composite material such that curing the thermoset composite material applies the heat lower than the melting temperature of the thermoplastic joining film to the thermoplastic joining film to form the composite joint.

17. The method of claim 14 further comprising:

applying an epoxy film adhesive between the thermoplastic joining film and the thermoset composite component, wherein applying the heat to the thermoplastic joining film diffuses a second thermoplastic material of the thermoplastic joining film into the epoxy film adhesive and diffuses the epoxy film adhesive into the thermoplastic joining film.

18. The method of claim 14 further comprising:

co-consolidating the thermoplastic joining film with the thermoplastic substrate to define the surface of the thermoplastic composite component.

19. The method of claim 18, wherein the co-consolidating is performed at a temperature of about 330° C. to about 400° C.

20. The method of claim 18, wherein the co-consolidating is performed at a temperature of at least 340° C.

21. The method of claim 18, wherein the co-consolidating comprises compression molding.

22. The method of claim 14 further comprising:

extruding the thermoplastic polymer and the polyaryletherketone polymer to yield the thermoplastic joining film.

* * * * *